United States Patent
Schulitz et al.

(10) Patent No.: US 12,203,541 B2
(45) Date of Patent: Jan. 21, 2025

(54) DRIVE UNIT HAVING AN ELECTRIC MOTOR

(71) Applicant: Continental Automotive Technologies GmbH, Hannover (DE)

(72) Inventors: Matthias Schulitz, Frankfurt am Main (DE); Jens Hoffmann, Darmstadt (DE); Adrian Messner, Mainz (DE); Ulrike Meyer, Schwalbach am Taunus (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/253,352

(22) PCT Filed: Nov. 16, 2021

(86) PCT No.: PCT/DE2021/200190
§ 371 (c)(1),
(2) Date: May 17, 2023

(87) PCT Pub. No.: WO2022/105970
PCT Pub. Date: May 27, 2022

(65) Prior Publication Data
US 2023/0417317 A1   Dec. 28, 2023

(30) Foreign Application Priority Data
Nov. 17, 2020   (DE) .................. 10 2020 214 433.8

(51) Int. Cl.
F16H 57/04   (2010.01)
B60K 1/00   (2006.01)
F16D 65/853   (2006.01)
F16H 57/032   (2012.01)
F16H 57/037   (2012.01)
(Continued)

(52) U.S. Cl.
CPC ........... F16H 57/0483 (2013.01); B60K 1/00 (2013.01); F16D 65/853 (2013.01);
(Continued)

(58) Field of Classification Search
CPC .. F16H 57/0483; F16H 57/032; F16H 57/037; F16H 57/0413; F16H 57/0415;
(Continued)

(56) References Cited

U.S. PATENT DOCUMENTS 5,585,681 A   12/1996   Bitsche
2006/0158024 A1*   7/2006   Wendl .................. B60K 7/0007
301/137

(Continued)

FOREIGN PATENT DOCUMENTS

DE   3935115 A1   5/1990
DE   4417432 A1   12/1994
(Continued)

OTHER PUBLICATIONS

German Search Report dated Jul. 7, 2021 for the counterpart German Patent Application No. 10 2020 214 433.8.
(Continued)

*Primary Examiner* — Edwin A Young

(57) ABSTRACT

A drive unit for a vehicle, having an electric motor and a transmission unit, wherein the electric motor is connected to the transmission unit via a drive shaft and at least one first output shaft can be driven to rotate by the transmission unit, wherein the drive unit also has at least one brake unit. The rotation of the at least one output shaft can be delayed by the brake unit, wherein the drive unit has at least one of the following: a lubricant circuit through which both the transmission unit and at least one brake unit can be supplied with lubricant, and a cooling circuit through which both (i) at least one of the electric motor and a power electronics system assigned to the electric motor; and (ii) at least one brake assembly can be supplied with coolant.

16 Claims, 2 Drawing Sheets

(51) Int. Cl.
*F16D 65/78* (2006.01)
*F16H 57/02* (2012.01)

(52) U.S. Cl.
CPC ......... *F16H 57/032* (2013.01); *F16H 57/037* (2013.01); *F16H 57/0413* (2013.01); *F16H 57/0415* (2013.01); *F16H 57/0476* (2013.01); *B60K 2001/001* (2013.01); *B60K 2001/006* (2013.01); *F16D 2065/783* (2013.01); *F16H 2057/02026* (2013.01); *F16H 2057/02034* (2013.01); *F16H 2057/02052* (2013.01)

(58) Field of Classification Search
CPC ....... F16H 57/0476; F16H 2057/02026; F16H 2057/02034; F16H 2057/02052; F16D 65/853; F16D 2065/783; B60K 2001/006
See application file for complete search history.

(56) References Cited

U.S. PATENT DOCUMENTS

2009/0050412 A1\* 2/2009 Bares ...................... B60B 35/12
165/41

| | | | |
|---|---|---|---|
| 2018/0339583 | A1\* | 11/2018 | Hirai ........................ B60L 9/18 |
| 2019/0232927 | A1 | 8/2019 | Meyer et al. |
| 2020/0300353 | A1 | 9/2020 | Ishikawa |
| 2020/0324635 | A1 | 10/2020 | Barna |

FOREIGN PATENT DOCUMENTS

| | | |
|---|---|---|
| DE | 102005003881 A1 | 7/2006 |
| DE | 102011113654 A1 | 3/2013 |
| DE | 102012112377 A1 | 6/2014 |
| DE | 102015214309 A1 | 2/2017 |
| DE | 102017125605 A1 | 5/2019 |
| DE | 102019208226 B3 | 10/2020 |
| EP | 3539812 A1 | 9/2019 |
| EP | 3697639 A1 | 8/2020 |
| WO | 2015078691 A2 | 6/2015 |
| WO | 2018029211 A1 | 2/2018 |
| WO | 2019101565 A1 | 5/2019 |

OTHER PUBLICATIONS

The International Search Report and the Written Opinion of the International Searching Authority mailed on Feb. 2, 2022 for the counterpart PCT Application No. PCT/DE2021/200190.

\* cited by examiner

DRIVE UNIT HAVING AN ELECTRIC MOTOR

TECHNICAL FIELD

The present invention relates to a drive unit having an electric motor. In particular, to a drive unit that connects an electric motor to other components of an electrically driven vehicle.

BACKGROUND

The design of drive units for electrically driven vehicles, such as motor vehicles, is generally known. Solutions of this type create advantages in terms of emission values of the vehicles, which is of ever-increasing importance.

WO 2018/029211 A1 describes a differential transmission having disk packs for exerting a braking torque on the output shafts of the transmission. The brake device is intended to be designed such that effective braking can be achieved with it and that it can easily be maintained. To this end, the brake device may be a drum brake which has a passive element, which exhibits a cylindrical frictional surface, and brake shoes, the frictional surfaces of which can be placed against the cylindrical frictional surface of the passive element. The passive element can be a brake drum or a radial brake disk, the cylindrical edge of which brake drum or radial brake disk serves as a frictional surface. In this case, the passive element is fastened to the differential cage and/or to one of the shafts. The brake shoes are held in a pivotable manner on a carrier plate which is fastened to the outside of the differential housing. The differential cage can be coupled to the drive shaft of an electric motor.

DE 10 2017 125 605 A1 describes running gear, comprising a vehicle frame having wheel suspensions with wheels, the wheel suspensions enabling a relative movement in the vertical direction and also turning and steering movements of the wheels relative to the vehicle chassis. In detail, running gear for a vehicle is proposed, with a vehicle chassis, with a steered axle, a first and a second steered wheel being arranged on the steered axle, with a friction brake device for braking the steered wheels, the friction brake device being arranged on the vehicle chassis.

EP 3 539 812 A1 describes an electric vehicle comprising a suspension and powertrain unit which comprises a vehicle frame module, an electric motor unit which is carried by the frame module centrally between two wheels, and a suspension comprising, for each wheel, an upper swing arm and a lower swing arm which each carry a wheel carrier. Each wheel carrier rotatably carries a respective wheel hub which is connected to the electric motor unit by a respective drive shaft. The brake disks are mounted on two output shafts of the electric motor unit at a distance from the respective wheels and are connected to the hubs of the two wheels by drive shafts. Owing to the absence of brake disks in the vicinity of the wheel hubs, the pivot joints connecting each wheel carrier to the respective upper and lower arm can be arranged such that they define a steering axis which passes through the respective wheel center and thereby has a kingpin displacement of substantially zero.

It is described in WO 2019/101565 A1 that the drive torques of an electric motor are transmitted to a vehicle wheel via a belt transmission, the belt transmission being arranged in a housing with a preferably electric brake acting on the output hub of the belt transmission. The brake consists of a brake disk, which is coupled to the output hub, and a magnetic coil which is arranged coaxially therewith and which is also used to actuate an additional drum brake. The output hub has a central mount for a cardan shaft, with which the forces reduced by the belt transmission are transmitted to a vehicle wheel.

However, solutions of this type can still be further improved.

It is the object of the present embodiments to provide a solution that can be used to produce a drive unit having an electric motor simply and cost-effectively.

The embodiments are described in the claims, in the description or in the figures, wherein further features described or shown in the dependent claims or in the description or in the figures can be the subject matter of the invention, individually or in any combination, unless the context clearly indicates the opposite.

SUMMARY

A drive unit for a vehicle, comprises an electric motor and a transmission unit, wherein the electric motor is connected to the transmission unit via a drive shaft and at least one first output shaft can be driven to rotate by the transmission unit, wherein the drive unit also has at least one brake unit, wherein the rotation of the at least one output shaft can be delayed by the brake unit, wherein the drive unit has at least one of the following: a) a lubricant circuit through which both the transmission unit and at least one brake unit can be supplied with lubricant, and b) a cooling circuit through which both (i) at least one of the electric motor and a power electronics system assigned to the electric motor; and (ii) at least one brake assembly can be supplied with coolant.

The drive unit described here serves for driving a vehicle. The drive unit is designed for example for driving an electrically driven vehicle. In this case, an electrically driven vehicle can basically be understood to mean a purely electrically driven vehicle or a hybrid vehicle.

The drive unit has an electric motor which can be designed in a manner known per se and comprises, for example, a stator and a rotor. With regard to the power data, the electric motor can be adapted to the selected field of use, i.e. for example the type of vehicle that is intended to be driven by the electric motor.

Furthermore, the drive unit has a transmission unit. Although it is possible to operate electric motors even without a transmission. The transmission unit can have transmission stages and a differential in a manner known per se, for example.

In order to transmit the driving force of the electric motor to output shafts the electric motor is connected to the transmission unit, for example to the transmission stages, via a drive shaft. Furthermore, the transmission unit, such as the differential, can transmit the driving force to at least one first output shaft, for example to two output shafts, in order thus to ultimately drive the output shaft by the electric motor. This can be done for example by rotating the output shaft or the output shafts. Therefore, in the case of the drive unit described here, a first output shaft and optionally a second drive unit can be driven by the transmission unit and thus by the electric motor. Furthermore, a wheel of the vehicle can be driven by the output shaft in a manner known per se.

In the case of the drive unit described, it is also provided that the drive unit also has at least one brake unit, wherein the rotation of the at least one output shaft can be delayed by the brake unit. Correspondingly, the output shaft and thus, for example, wheels of a vehicle can be braked by the brake unit. The exact configuration of the at least one brake unit, for example the two brake units of the drive unit, is not in principle limited. The brake unit or the brake units can be a wet-running brake, as will be described later in greater detail.

In the case of the drive unit described here, the drive unit also has at least one of the following: a) a lubricant circuit through which both the transmission unit and at least one brake unit can be supplied with lubricant, and b) a cooling circuit through which both (i) at least one of the electric motor and a power electronics system assigned to the electric motor, and (ii) at least one brake assembly can be supplied with coolant and can thereby be cooled.

Provision can be made here for feature a) to be provided without feature b), or feature b) to be provided without feature a), or for both of features a) and b) to be provided.

According to feature a), this refinement makes use of the fact that the transmission is often provided with a lubricant circuit, such as an oil circuit with a lubricant, such as transmission oil, which is circulated in the lubricant circuit. For example, corresponding lubricant lines and a lubricant pump belong to the lubricant circuit. The circulating components for lubricants and/or coolants may be integrated in a common housing of a drive unit. With this integrated structure, external wiring or an add-on solution can be streamlined. If the lubricant circuit now also serves, for example, to supply the brake unit, synergistic effects can be achieved in that there is a reduction in corresponding components of the circuit, such as the pump drive and/or pump. Therefore, the structure can be designed to be simpler and to have smaller structural dimensions.

These features are equally valid for other lubricants.

For example, the lubricant of the lubricant circuit can be used in this case for lubrication and/or internal or also external cooling of the brake unit. Thus, for example, one circuit can satisfy both features a) and b) equally.

With regard to the cooling circuit, however, this may differ from the lubricant circuit described above, such as an oil circuit, but may also be a fluid-based system. In particular, the cooling circuit can be a water-based cooling circuit and can thus have cooling ducts which carry cooling water in order to enable external as well as internal cooling, for example.

In this refinement, for example, the cooling circuit required for cooling of the electric motor and/or the power electronics system can equally be used to cool the brake unit, such as the multiple disk brakes. Components, such as a second coolant pump, can be dispensed with and the cooling circuit can also have a simple structure.

The above-described integration of the lubricant circuit or cooling circuit thus shows integration of the components and therefore improved manufacturability and space or weight requirements.

With regard to the brake unit, it may be that at least one brake unit comprises a wet-running brake. In this refinement, for example in combination with the feature according to which the drive unit has a lubricant circuit, through which both the transmission unit and at least one brake unit can be supplied with lubricant, the aforementioned synergy effects can occur. This is because the lubricant that is required in any case for lubricating the transmission, and the pump can be used for example for lubricating and/or cooling the wet-running brake. The increased volume of lubricant thereby associated with the brake improves the thermal load-bearing capacity of the brakes. Lubricant pumps can be used to actively pump the lubricant into and out of the brakes, and can thereby reduce the residual torques when driving without braking. As indicated above, the multiple use of lubricant and pumps reduces costs, weight and installation space.

With regard to wet-running brakes, the use of one or more multiple disk brakes can be useful. For example, the multiple disk brake can comprise a brake with multiple disks. A multiple disk brake, for example, is an encapsulated design means that there is no brake dust emission, which might apply when considering possible future legal restrictions. In addition, brake dust can be prevented from settling on wheel rims or other parts of the vehicle.

Furthermore, multiple disk brakes can be designed, for example, as what are referred to as lifetime brakes. This means that the brakes can be designed in such a way that no pad change is necessary. This can reduce servicing and in turn can save on costs.

In addition, a comparatively simple modular or regulated adaptation of braking power and/or cooling power can be undertaken jointly or in separately metered fashion by influencing the corresponding circulation (of coolant and/or lubricant) individually or in mutually coordinated and electronically controlled or regulated fashion as required. The control or regulation of lubricant circulation and/or coolant circulation may take place on the basis of regulation of the fluid pressure. This is done, for example, using one or more electrohydraulic pressure control valves, and it may be useful or necessary for regulation purposes to measure the respective fluid pressure (actual pressure) using one or more fluid pressure sensors and to make it available to an electronic control unit, which on the basis thereof controls or regulates the lubricant pump and/or coolant pump, which is preferably driven by an electric motor, as required, depending on the driving request and/or braking request, and optionally in mutually coordinated fashion. It goes without saying that this control and/or regulation in an application in connection with automated driving is carried out in full or in part with data comparison with the drive and braking requirements, may be regulated in an automated manner.

The drive unit may also be integrated such that the transmission unit and the brake unit, as, for example, optionally other and/or further components, are arranged in or on their common housing. Electromotive pump drives can also be arranged in the common housing or on the common housing. An arrangement on the common housing is intended to mean for example that the brake unit or the plurality of brake units are for example fastened directly to the housing, i.e. form one unit together with the housing.

For the purposes of the present embodiments, the arrangement of these components in or on a common housing is intended to mean for example that the housing is designed in one piece or that, in the case of a multi-part design of the housing by means of a plurality of housing parts, all the corresponding housing parts for forming the housing, in which or on which the aforementioned components are integrated, are connected in particular immovably or rigidly to one another. For example, in the case of a multi-part configuration, the housing parts are fastened to one another so as to be immovable relative to one another.

For example, the configuration of the drive unit described here can offer a self-contained, substantially autonomous drive and braking system together with the transmission. This enables that outlay on development for example may be reduced to the bodyshell and suspension. With regard to the wheel suspension, there is the may be freedom in the design thereof. This is limited when using brakes installed the wheel, which can significantly improve the range of use and adaptability of the drive unit according to the embodiments.

In addition, a reduction in the unsprung masses can be made possible in a vehicle equipped with such a drive unit, which in turn leads to an improvement in the driving dynamics.

The integration of the brake housings in the existing parts or the integration of the brake unit in or on a common housing with the transmission and electric motor can also enable a compact design with high power density and low complexity of parts.

For example, if a plurality of braking units is used, these can also be controlled individually. In this regard, the use of two independent brakes can enable wheel-specific braking and thus a high degree of controllability and safety.

When using an electromechanical brake as the at least one brake unit, the wiring harness can be simplified compared to a brake located in the wheel because of the neighboring, likewise electrical components. The close arrangement of drive and brakes simplifies the electrical and/or mechanical communication of these components, which can be used, for example, when blending, i.e. simultaneous recuperative braking of the electric motor and friction brake.

Finally, the drive unit, as described here, can enable a weight reduction in vehicles.

It may also be that two output shafts can be driven to rotate by the transmission unit, wherein two brake units are provided, wherein the rotation of an output shaft can be delayed by a respective brake unit. In this refinement, the two output shafts can for example drive two wheels of an axle and the corresponding brakes can each brake one wheel. As a result, the safety of the vehicle can be increased since each wheel can be selectively accelerated or braked according to a critical driving situation. This can be done in electrically controlled fashion, for example, by an anti-lock braking system or an anti-slip control system.

It may also be possible that the transmission unit has a differential for driving two output shafts, wherein furthermore a first distance $D_1$ between the differential and a first brake unit, which acts on the first output shaft, and a second distance $D_2$ between the differential and a second brake unit, which acts on the second output shaft, is substantially the same. For the purposes of the embodiments, a distance which is substantially the same is intended to be understood in particular as meaning that the distance has a maximum deviation that is less than 1%, based on the larger distance. In this refinement, the structure can be particularly simple, and therefore production can be improved, for example in terms of complexity and costs.

Alternatively, it may be possible that the transmission unit has a differential for driving two output shafts, wherein furthermore a first distance $D_1$ between the differential and a first brake unit, which acts on the first output shaft, and a second distance $D_2$ between the differential and a second brake unit, which acts on the second output shaft, differs. For the purposes of the embodiments, a different distance is intended to be understood in particular as meaning that the distance has a minimum deviation that is greater than or equal to 1%, for example greater than or equal to 5%, for example greater than or equal to 35%, based on the larger distance.

In this refinement, an adaptability to the specific circumstances can be undertaken. As a result, installation space can be saved, for example, mechanical events can be taken into account and for example a specific installation position of the drive unit and in particular of the differential can be taken into account, such that it is possible to react to specific requirements regarding the installation space.

With regard to the housing or the housing parts, it may also be possible that the common housing is designed as an aluminum die-cast component. This refinement permits further simplified manufacturability, since the housing components can be easily adapted to the required spatial conditions. In addition, this refinement makes it possible for the embodiment described to also be integrated into existing processes.

With regard to further technical features of the drive unit, reference is made to the description of the vehicle, to the figures and to the description of the figures, and vice versa.

The subject matter of the embodiments is also an electrically driven vehicle, having a drive unit for driving at least one vehicle wheel, the drive unit being configured as described in detail above.

In this case, for example, a corresponding drive unit can be provided for each wheel to be driven, or provision can be made for one drive unit to be provided for one axle, i.e. for two wheels to be driven.

In the latter refinement, provision can therefore be made for two output shafts to be drivable by a common drive unit. Accordingly, only one drive unit can be provided or one drive unit for one axle to be driven in each case. In this refinement for example, a cost- and space-saving configuration can be made possible and production can be carried out cost-effectively and simply.

With regard to further technical features of the vehicle, reference is made to the description of the drive unit, to the figures and to the description of the figures, and vice versa.

BRIEF DESCRIPTION OF THE DRAWINGS

The embodiments are explained in more detail below with reference to the figures, wherein one or more features of the figures can be a feature of the invention, either alone or in combination. Furthermore, the figures are only to be seen as examples but not restrictive in any way.

DETAILED DESCRIPTION

Figure 1:
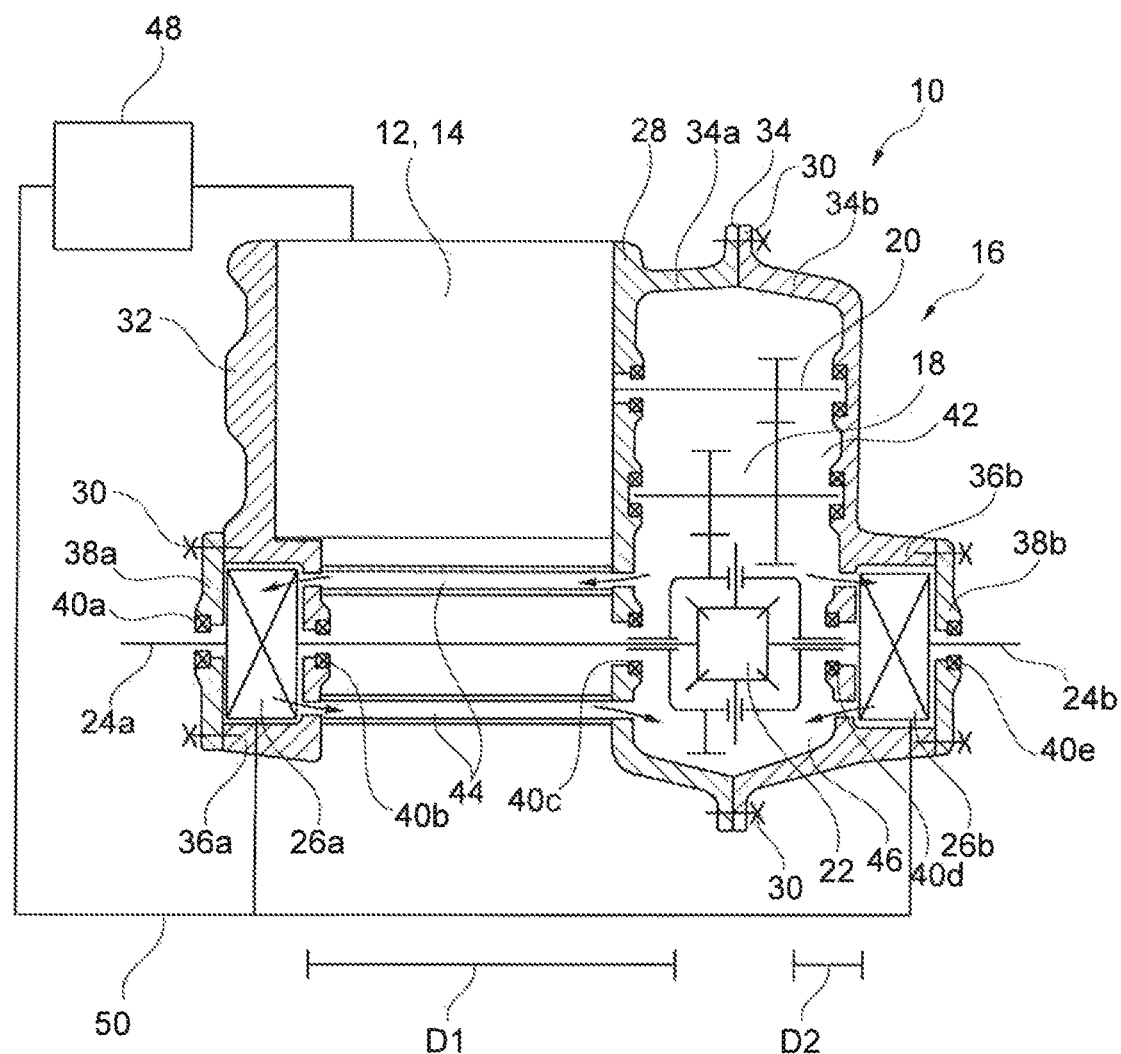
FIG. 1 schematically shows a sectional view through a first refinement of a drive unit.

FIG. 1 shows a refinement of a drive unit 10. The drive unit 10 serves for example to drive an electrically drivable vehicle, such as a purely electric vehicle.

The drive unit 10 comprises an electric motor 12, which can be assigned a power electronics system 14, for example, and also a transmission unit 16. The transmission unit 16 can have a plurality of transmission stages 18 in order to transmit a rotation of a drive shaft 20, which is connected to the electric motor 12 or is set into rotation by the latter, to at least one, in the present refinement to two, output shafts $24_a$, $24_b$, for example via a differential 22. The electric motor 12 is thus connected to the transmission unit 16 via the drive shaft 20, and the output shafts $24_a$, $24_b$ can be driven to rotate by the transmission unit 16 and thus the electric motor 12.

FIG. 1 also shows that the drive unit 10 also has two brake units $26_a$, $26_b$, which can be designed in principle identically to or differently from each other. In particular, the brake units $26_a$, $26_b$ can be wet-running brakes, wherein multiple disk brakes may be possible. The brake units $26_a$, $26_b$ are arranged in such a way that the rotation of the output shafts $24_a$, $24_b$ can be delayed by the brake units $26_a$, $26_b$.

In particular, FIG. 1 shows that the electric motor 12, the transmission unit 16 and the brake units $26_a$, $26_b$ are arranged in a common housing 28. The housing 28 is of multi-part design here and has a large number of housing parts fastened to one another. In detail, the housing parts are connected to one another by screw connections 30.

The configuration of the housing 28 will be described in more detail below. Firstly, a motor cover unit 32 with bearings $40_a$, $40_b$, which forms the housing part for the electric motor 12, is provided. Said motor cover unit is connected to the transmission housing part 34, which comprises a first transmission housing half $34_a$ and a second transmission housing half $34_b$. For the brake units $26_a$, $26_b$ there is also provided an integrated first brake housing $36_a$ and an integrated second brake housing $36_b$, which are closed by a first brake housing cover $38_a$ and a second brake housing cover $38_b$.

Figure 3:
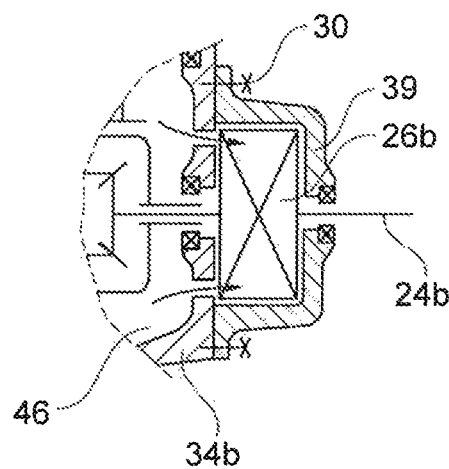
FIG. 3 schematically shows a sectional view through a detail of a further refinement of a drive unit.

Alternatively, as is shown in the enlarged refinement according to FIG. 3, a brake housing part 39 which encloses the second brake unit $26_b$ can be arranged on the second transmission housing half $34_b$. A brake housing cover $38_b$ may then be omitted. The same is self-evidently possible for the first transmission housing half $34_a$, on which a brake housing part 39 can also be arranged.

The refinement according to FIG. 3 allows an axial installation space that can be changed, for example by an adaptable number of brake disks of a multiple disk brake, to be realized for example by brake housing parts 39 of different sizes. Therefore, the braking torque that can be achieved can be changed by the number of brake disks. Different disk thicknesses also enable adaptation to thermal requirements. However, this results in the need for a variable axial installation space.

Bearings $40_a$, $40_b$, $40_c$, $40_d$, $40_e$ are also provided for guiding the output shafts $24_a$, $24_b$ from the interior of the housing 28 to the exterior of the housing 28 and also for supporting the output shafts $24_a$, $24_b$.

FIG. 1 also shows that the drive unit 10 has a lubricant circuit 42, such as an oil circuit, through which both the transmission unit 16 and the brake units $26_a$, $26_b$ can be supplied with lubricant, such as oil. Correspondingly, for example, oil conveyed to the transmission stages 18 can also be conveyed in the direction of the arrow to the brake units $26_a$, $26_b$ or can be conveyed away from them. The refinement according to FIG. 1 has lubricant lines 44, such as oil lines, since the brake unit $26_a$ is not arranged directly at the volume 46 of the transmission stages 18. This is due to the fact that, according to the refinement of FIG. 1, a first distance $D_1$ between the differential 22 and the first brake unit $26_a$ and a second distance $D_2$ between the differential 22 and the second brake unit $26_b$ differs, wherein the distance $D_1$ is for example greater than the distance $D_2$, or basically also vice versa. In FIG. 1, the distance $D_1$ is selected in such a way that the first brake unit $26_a$ is still located below the electric motor 12. If the distance $D_1$ is selected to be greater, for example, the electric motor 12 can be located between the brake units $26_a$, $26_b$, as a result of which the first output shaft $24_a$ can be placed closer to the electric motor 12. This enables a reduced radial space requirement, i.e. at right angles to the first output shaft $24_a$ and thus approximately at right angles to a vehicle axis.

Furthermore, in the refinement according to FIG. 1, the braking torque to be transmitted via the output shaft $24_a$ is higher than the drive torque. This shaft can therefore be dimensioned to be more compact and lighter than the output shaft $24_b$.

In addition, it becomes possible to save on bearings $40_a$, $40_b$, $40_c$, $40_d$, $40_e$. Regarding the bearings $40_a$, $40_b$, $40_c$, $40_d$, $40_e$ shown in FIG. 1, for example, the bearings $40_b$ and $40_c$ can be saved.

A cooling circuit 48 is also shown in FIG. 1, which can supply both at least one brake unit $26_a$, $26_b$ and also the electric motor 12 and/or a power electronics system 14 with coolant, such as water. The cooling circuit 48 has for example a coolant pump and optionally a reservoir for coolant and also coolant lines 50 through which the corresponding components can be supplied with coolant and thereby cooled.

Figure 2:
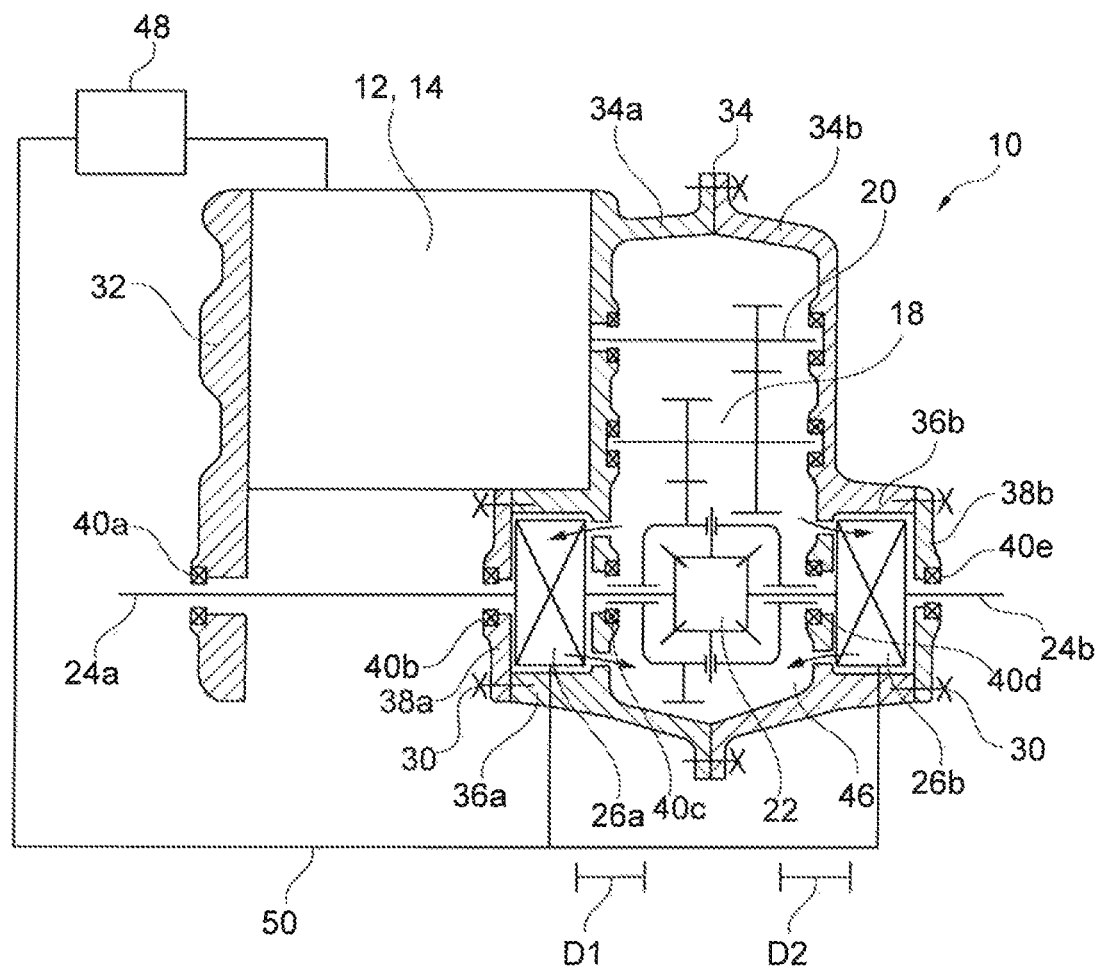
FIG. 2 schematically shows a sectional view through a further refinement of a drive unit.

The refinement according to FIG. 2 largely corresponds to the refinement according to FIG. 1, and therefore the above statements also apply to the refinement according to FIG. 2, with the exception that, according to FIG. 2, the first distance $D_1$ between the differential 22 and the first brake unit $26_a$ and the second distance $D_2$ between the differential 22 and the second brake unit $26_b$ is substantially the same. In FIG. 2, the first brake unit $26_a$ and also the second brake unit $26_b$ are located below the electric motor 12 and on one side of same, which enables a reduced axial space requirement, i.e. parallel to the first output shaft $24_a$ and thus approximately parallel to a vehicle axis. In addition, additional lubricant lines 44 may be dispensed with. Furthermore, lubricant volume can be correspondingly saved. Further savings can be permitted, for example, because bearings $40_a$, $40_b$, $40_c$, $40_d$, $40_e$ can be dispensed with, such as, for example, the bearing $40_b$ located directly to the left of the first brake unit $26_a$ in FIG. $2_b$, as a result of which in turn costs and weight can be saved.

It remains to be added that the present embodiments may further extend to an interconnected vehicle drive and braking system which, for the sake of efficiency, may have interlinked electronic control or regulation methods for regulation of the fluid flow. Said drive system with the two fluid circuits can have an integrated electronic controller or regulator. As a result, controlled or regulated adaptation of braking power and/or cooling power can be undertaken jointly or in separately metered fashion by influencing the corresponding circulation (of coolant and/or lubricant) individually or in mutually coordinated and electronically controlled or regulated fashion as required. The control or regulation of pump capacity for lubricant circulation and/or coolant circulation may take place on the basis of regulation of the fluid pressure as required and in an energy-efficient manner. This may be done, for example, using one or more electrohydraulic pressure control valves, and it may be useful or necessary for regulation purposes to measure the respective fluid pressure (actual pressure) using one or more fluid pressure sensors and to make it available to an electronic control unit, which on the basis thereof controls or regulates the lubricant pump and/or coolant pump, which may be driven by an electric motor, as required, depending on the driving request and/or braking request, and optionally in mutually coordinated fashion. This control and/or regulation in an application in connection with automated driving is carried out in full or in part with data comparison with the drive and braking requirements, may be regulated in an automated manner. In this context, the control unit can be integrated as a central "one box solution" for the purpose of controlling the combined drive unit, and the central control unit is electronically connected to peripheral vehicle electronics and embedded in a network, and furthermore preferably there is at least one interface for the purpose of data exchange and/or control coordination in conjunction with C2C (car-to-car) and/or C2X (car-to-X) communication systems.

The invention claimed is:

1. A drive unit for a vehicle, having an electric motor and a transmission unit, wherein the electric motor is connected to the transmission unit via a drive shaft and a first output shaft and a second output shaft can be driven to rotate by the transmission unit, wherein the drive unit also has at least one brake unit, wherein the rotation of the one of the first output shaft and second output shaft can be delayed by the at least one brake unit, wherein the drive unit has at least one of the following:
   a) a lubricant circuit through which both the transmission unit and the at least one brake unit can be supplied with lubricant, and
   b) a cooling circuit through which both
      (i) at least one of the electric motor and a power electronics system assigned to the electric motor; and
      (ii) the at least one brake unit can be supplied with coolant.

2. The drive unit as claimed in claim 1, wherein the at least one brake unit comprises a wet-running brake.

3. The drive unit as claimed in claim 2, wherein the wet-running brake is a multiple disk brake.

4. The drive unit as claimed in claim 1, wherein the transmission unit and the at least one brake unit are arranged in a common housing, and the electric motor is also one of: arranged in the common housing and on the common housing.

5. The drive unit as claimed in claim 4, wherein the common housing is designed as an aluminum die-cast component.

6. The drive unit as claimed in claim 1, wherein the lubricant circuit is an oil circuit.

7. The drive unit as claimed in claim 1, wherein the cooling circuit is a water-based cooling circuit.

8. The drive unit as claimed in claim 1, wherein two output shafts can be driven to rotate by the transmission unit, wherein two brake units are provided, wherein the rotation of an output shaft can be delayed by a respective brake unit.

9. The drive unit as claimed in claim 1, wherein the transmission unit has a differential for driving the first output shaft and the second output shaft, wherein furthermore a first distance between the differential and a first brake unit, which acts on the first output shaft, and a second distance between the differential and a second brake unit, which acts on the second output shaft is substantially the same.

10. The drive unit as claimed in claim 1, wherein the transmission unit has a differential for driving the first output shaft and the second output shaft, wherein furthermore a first distance between the differential and a first brake unit, which acts on the first output shaft, and a second distance between the differential and a second brake unit, which acts on the second output shaft, is different.

11. The drive unit as claimed in claim 1, wherein the lubricant circuit and/or the cooling circuit have/has an electronic controller or electronic regulator for the purpose of power adaptation.

12. The drive unit as claimed in claim 11, wherein one of the electronic controller and the electronic regulator has one of a pressure control device and a pressure regulation device for the purpose of fluid power adaptation.

13. The drive unit as claimed in claim 12, wherein one of the electronic controller and the electronic regulator of the two fluid circuits is designed independently and is adjusted in each case in an individually metered manner.

14. The drive unit as claimed in claim 12, wherein one of the pressure control device and the pressure regulation device comprises electrical components wherein the electrical components is at least one of: at least one fluid pressure sensor, at least one electrohydraulic valve, an electromotive pump drive motor, and at least one electronic control unit.

15. The drive unit as claimed in claim 11, wherein control or regulation of the two fluid circuits is mutually coordinated.

16. The drive unit of claim 1, wherein the drive unit drives at least one wheel of an electrically driven vehicle.

* * * * *